United States Patent [19]

Haegens et al.

[11] Patent Number: 5,260,075
[45] Date of Patent: Nov. 9, 1993

[54] BREADSTICK TASTING BREAD-LIKE, AND METHOD OF MAKING IT

[75] Inventors: Noel Haegens; Romeo Signani, both of Parma, Italy

[73] Assignee: Barilla G.E.R. F.LLI - Societa per Azioni, Parma, Italy

[21] Appl. No.: 769,689

[22] Filed: Oct. 2, 1991

[51] Int. Cl.⁵ .................................................. A21D 8/00
[52] U.S. Cl. ........................................ 426/19; 426/27
[58] Field of Search .................... 426/27, 19; D1/120, D1/128, 129

[56] References Cited

U.S. PATENT DOCUMENTS

| D. 29,273 | 8/1898 | Kolb | D1/129 |
| 2,134,029 | 10/1938 | Brooks | D1/129 |
| 3,620,173 | 11/1971 | Sternberg | 426/18 |

FOREIGN PATENT DOCUMENTS 2640470  6/1990  France .
1136772  12/1968  United Kingdom .

OTHER PUBLICATIONS

World Patents Index, Section Ch, Week 7724, Derwent Publications Ltd., London, GB., Class C, AN 77-42797Y and SU-A-533 368 (Badaev Bread Wks) Nov. 30, 1976-Abstract.
World Patents Index, Section Ch, Week 7311, Derwent Publications Ltd., London, GB., Class C, AN 73-155-42U and JP-B-48 007 783 (Ota M.)-Abstract.
Tressler et al, Food Products Formulary, 1975, vol. 2., The Avi Publ. Co.: Westport, Conn., pp. 229-231.

Primary Examiner—Joseph Golian
Attorney, Agent, or Firm—Sughrue, Mion, Zinn, Macpeak & Seas

[57] ABSTRACT

A breadstick tasting bread-like is formed from a dough for breadstick making which incorporates an aqueous suspension of a mixture of flour and yeast. After said dough has been allowed to rise, and rolled, from the resulting sheet dough preforms are prepared which are then subjected to a preliminary, quick baking heat treatment step followed by baking to completion.

1 Claim, 1 Drawing Sheet

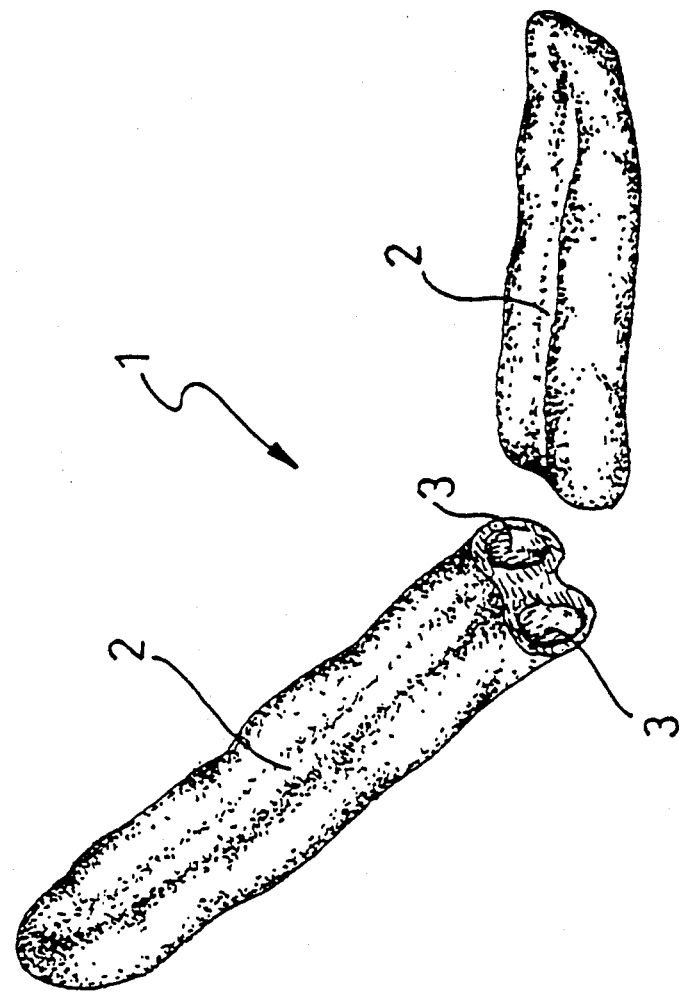

BREADSTICK TASTING BREAD-LIKE, AND METHOD OF MAKING IT

BACKGROUND OF THE INVENTION

This invention relates to a breadstick tasting bread-like.

The invention also relates to a method of making such a breadstick type.

As is known, breadsticks are highly popular bakery consumables which are today manufactured and packaged mainly by industrial methods.

Also known is that breadsticks are especially valued on account of their low moisture content making them crisp and crumbly, as well as adapted for preservation over long periods.

While esteemed for their features, conventional breadsticks may be an uninviting choice.

In addition, they are low in fragrance, and while providing an alternative to bread, are never really as welcome.

SUMMARY OF THE INVENTION

It is the object of this invention to provide a breadstick which has typical rod-like shape and organoleptic features whereby it can be considered to have taste and flavor which are typical of bread, even from an aesthetic standpoint.

This object is achieved by a breadstick being characterized in that it is formed from a dough for breadstick making which incorporates an aqueous suspension of a mixture of flour and yeast.

In a preferred embodiment, this breadstick is formed with a lengthwise cleft using a quick baking heat treatment.

The invention also concerns a method of making breadsticks which taste bread-like, characterized in that it comprises the steps of incorporating to a dough for breadstick making an aqueous suspension of a mixture of flour and yeast, allowing the dough to rise at room temperature and under an atmosphere at a selected relative humidity, rolling out and subsequently gauging said dough in a conventional way to obtain sheet dough with a selected thickness, working breadstick preforms out of said sheet dough, subjecting the breadstick preforms to a quick baking heat treatment to form them with a surface cleft extending lengthwise thereto, and completing the breadstick preform baking.

The features and advantages of a breadstick according to the invention will become apparent from the following detailed description of an embodiment thereof, given by way of illustration and not of limitation with reference to the accompanying drawing.

BRIEF DESCRIPTION OF THE DRAWINGS

The drawing shows a sectional perspective view of a breadstick embodying this invention.

DETAILED DESCRIPTION OF THE INVENTION

With reference to the drawing, generally shown at 1 is a breadstick which has been formed in accordance with this invention.

The breadstick 1 is formed from a dough for breadstick making which incorporates an aqueous suspension of a mixture of flour and yeast.

Specifically, a mixture is first prepared from flour and yeast. The addition of salt to the mixture is also contemplated.

The basic ingredient of the mixture is flour, in the by-weight proportion of 76%, yeast being in the amount of 22.0% by weight. These ingredients are admixed with an amount of salt up to 2.0% by weight, using a mixer of conventional design.

The mixture can be stored in sacks to a predetermined weight, e.g. 50 kilograms.

Approximately twenty four hours before use, an acqueous suspension of said mixture is prepared.

Into a conventional two-speed stirrer, there are placed a predetermined amount of water at a temperature of 15° C. and a corresponding amount of said mixture of flour, yeast and salt. For this purpose, the stirrer includes a process vessel provided with a jacket through which cooling water at 4° C. is circulated.

The stirrer is first operated at its high speed setting for about thirty minutes, and subsequently at its low speed setting until the mixture becomes fully suspended.

At this stage, a substantially whey-like suspension is obtained which is used, in accordance with this invention, as ingredient in the dough for breadstick making, to a proportion to be specified.

A first step of the inventive method consists of incorporating the aforesaid aqueous suspension of flour, yeast and salt to a conventional dough for breadstick making.

The dough ingredients are all mixed in a dough mixer of the type called "San Cassiano".

The dough ingredients are listed herein below, along with their respective percentages by weight:

| Flour | 66.3% |
| Vegetable oil | 5.3% |
| Lard | 1.3 |
| Salt | 1.7 |
| Whey-like suspension | 10.6% |
| Water | 14.6% |

The mixing step is started for approximately one minute at low speed in the above-mentioned mixer, and continued for four to five minutes at a higher speed.

The following step of this method provides for the dough rising in a standby vat. The dough is allowed to rise for five hours at room temperature (23° C.) in an atmosphere at 60% relative humidity.

Portions of the dough having a predetermined weight are then passed through a rolling stand to yield a sheet of dough, which is thereafter gauged down to a sheet thickness of 5–6 mm.

At the end of this operation, the sheet is processed through a rolling stand into three overlapping plies.

After a further pass in the nip of pairs of gauging rolls to reduce the sheet to a finished thickness of 4–5 mm, said sheet is supplied to a breadstick maker known per se which delivers breadstick preforms. The breadsticks are cut to a desired size and their typical elongate rod-like shape.

A further step of the method of this invention consists of subjecting the breadstick preforms to a heat treatment directed to form them with a lengthwise cleft 2. To this aim, the breadstick preforms exiting the breadstick maker are laid onto the heated mesh of an oven and subjected to a heat treatment of flash baking at 100°-120° C.

The baking time in this step is of just 8 minutes, which allows the lengthwise surface cleft 2 to be produced on each breadstick 1, thereby imparting the breadstick with a unique appearance resembling, for instance, that of a so-called French loaf, as shown in the accompanying drawing.

This baking step with heat treatment, as carried out for a relatively short time, imparts a pale color to the preform.

The inventive method includes completion of the preform baking at a temperature of 150°-170° C. for about 10-12 minutes.

At the end of this, the last, process step, the breadsticks are ready to be packaged.

The method of this invention yields a breadstick product which tastes unexpectedly like bread. In addition, breadsticks so made resemble bread visually as well, in that they have in cross-section a cellular appearance which is quite different from the typically sponge-like appearance of breadsticks made with conventionally known methods.

We claim:

1. A method of making breadsticks which taste like bread comprising the steps of:

incorporating an aqueous suspension of a mixture of flour, yeast and salt in a by-weight proportion of 76%, 22%, and 2%, respectively, in a breadstick dough;

allowing the dough to rise at room temperature in an atmosphere at 60% relative humidity;

rolling out and subsequently gauging said dough to obtain sheet dough having a predetermined thickness;

working breadstick preforms out of said sheet dough;

subjecting the breadstick preforms to a quick baking heat treatment on a heated mesh at 100° to 120° C. for up to 8 minutes to form the breadsticks with a surface cleft extending lengthwise thereto; and completing the breadstick preform baking at a temperature of 150°-170° C. for at least 10-12 minutes.

* * * * *